March 18, 1941.  J. M. STUCKER  2,235,303
ELECTRIC STEAM GENERATOR
Filed Dec. 30, 1939  2 Sheets-Sheet 1
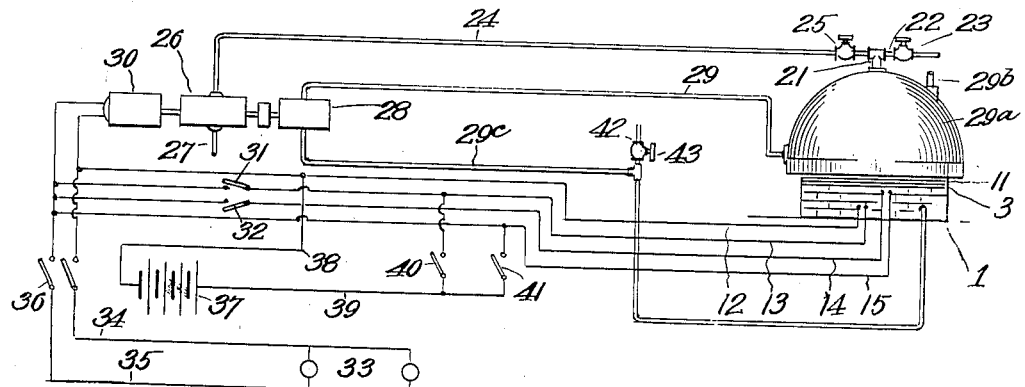
Fig.1.
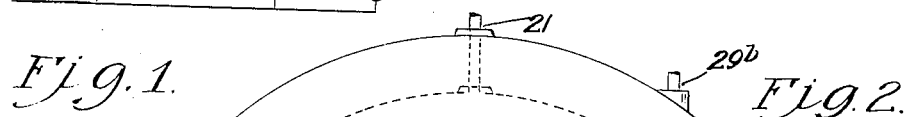
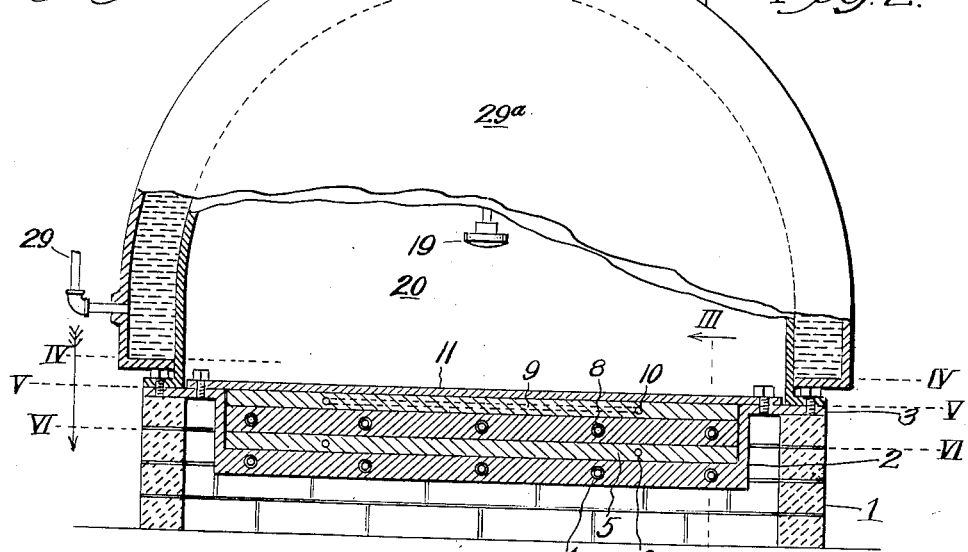
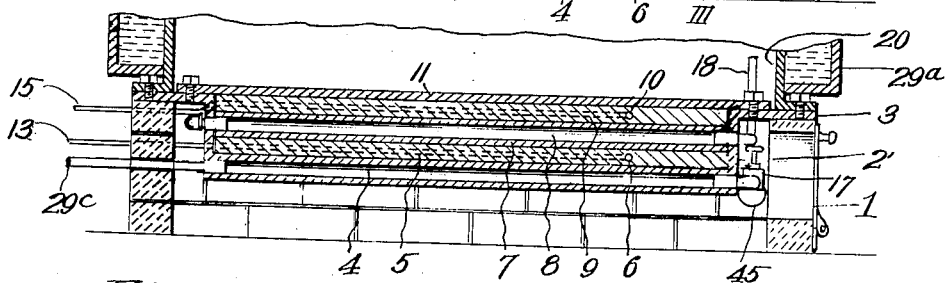
Fig.3.
Inventor
John M. Stucker
By Thorpe & Thorpe
Attorneys March 18, 1941.    J. M. STUCKER    2,235,303
ELECTRIC STEAM GENERATOR
Filed Dec. 30, 1939    2 Sheets-Sheet 2

Inventor
John M. Stucker
By Thorpe & Thorpe
Attorneys

Patented Mar. 18, 1941

2,235,303

UNITED STATES PATENT OFFICE 2,235,303

ELECTRIC STEAM GENERATOR

John M. Stucker, Kansas City, Mo.

Application December 30, 1939, Serial No. 311,851

6 Claims. (Cl. 219—39)

This invention relates to steam generators and has for one of its objects to produce an electrically heated steam generating plant of high efficiency and great flexibility to suit various service demands and which can be operated economically.

Another object of the invention is to provide a unit electrically heated water or steam generating structure made up of laminated plates, the plates alternately comprising water and heating plates as will hereinafter more particularly appear.

A further object of the invention is to produce a steam plant of the general character outlined which is of strong, durable, efficient and inexpensive construction; and in order that it may be fully understood, reference is to be had to the accompanying drawings, in which—

Figure 1 is a general diagrammatic view of a steam plant embodying the invention.

Figure 2 is an enlarged central vertical section taken through the boiler.

Figure 3 is a section on the line III—III through the generating unit of the boiler.

Figure 4:
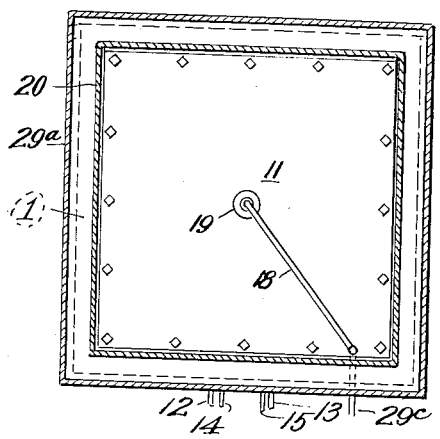
Figure 4 is a section on the line IV—IV of Figure 2.
Figure 5:
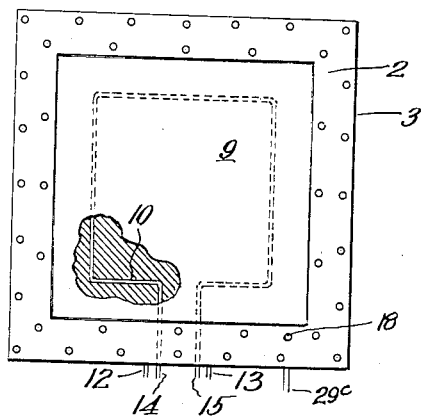
Figure 5 is a section on the line V—V of Figure 2.
Figure 6:
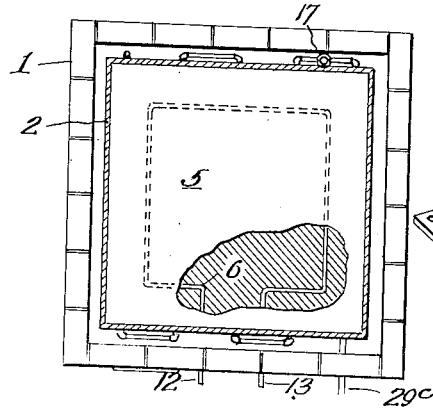
Figure 6 is a section on the line VI—VI of Figure 2.
Figure 7:
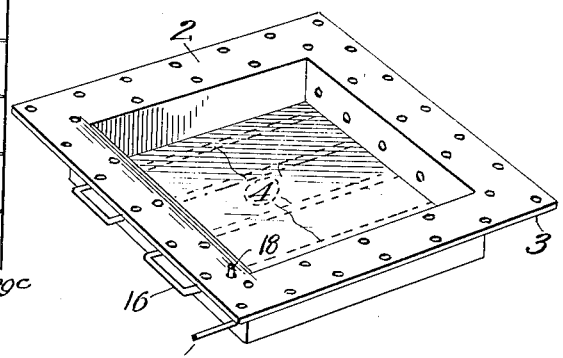
Figure 7 is a perspective view of the casing member of the generator of the invention.

In the said drawings, where like reference characters identify corresponding parts in all of the figures, the steam generator of the invention will be described in detail before the general system or plant is described. In the drawings, 1 is a suitable boiler foundation on which is mounted an open-top box-like casing 2 provided with a flange 3 resting on top of the foundation. The bottom of said casing 2 forms a water plate by being provided with a plurality of parallel longitudinally extending water passageways 4. Received within the casing 2 and resting flatwise against the bottom thereof, is a heating plate 5 containing an embedded electric heating resistance unit 6, which may be cast or otherwise disposed directly in the plate. On top of the plate 5 is a second water plate 7 provided with parallel water passages 8, and on top of the latter water plate is a second electric heating plate 9, with electric heating unit 10 embedded therein, it being understood that the lamination or sandwiching of water and heating plates may be continued, depending upon the capacity of the system. The heating unit assembly is clamped by a cover plate 11 which is bolted tightly down in position to hold all of the plates pressed together. It is to be understood that the metal of the casing and of the plates will be of some good heat conducting strong material, such as aluminum. The electric heating units within the heating plates may be of any desired type that can be molded or cast in plate, such as resistance wire coils enclosed in a tubular metal sheath and insulated by powdered magnesium oxide or equivalent material.

After the parts have been assembled as described, lead wires 12—13 and 14—15 are respectively connected to the heating plates 5 and 9, said wires being brought out through the boiler support as shown in Figure 1. The water passageways of the plates 2—7 are connected together by U-bends 16, and at desired points, clean-outs 17 may be provided, the clean-outs to be described hereinafter in detail. With a heat or steam generator unit of the type disclosed, it will be apparent that by proper design of the parts any determined B. t. u. output may be secured.

However, to take care of situations such as at the start of operations or where the full output of the unit is not required, it is preferred that the last water passageway of the plate 8 shall be connected by a pipe 18 to a spray head 19 arranged within expansion chamber 20 of dome-like form, bolted over the laminated heater, said spray discharging downwardly on the hot cover plate 11. By this arrangement, when the boiler is operating at full capacity, the steam discharged from the spray head will be immediately dried and expanded to high pressure, but when the plant is operating below capacity, water at the steaming point may be discharged by the spray head against the hot plate 11, and said water will be instantaneously flashed into steam.

In the preferred arrangement, the steam from the expansion chamber 20 flows out through a steam line 21 and a part of said steam may be diverted through a line 22 controlled by a valve 23 to a steam engine, radiator system, or the like, not shown. The other part of the steam may flow through a pipe 24 controlled by a valve 25, to a steam turbine 26, the exhaust of the turbine discharging through a pipe 27. The turbine may drive a water pump 28, the intake of said pump being connected by a pipe 29 to the water preheating chamber 29a surrounding the expansion chamber and fed by a pipe 29b, so that water at high pressure is delivered by the pump through a pipe 29c to the first pass of the water passageways of the plate 5, as will be readily understood as above outlined.

The turbine 26 may also drive an electric generator 30, said generator being connected by wires 12 and 13, controlled by switch 31 to the heating plate 5, the other heating plate 9 being connected in parallel with the first plate, by means of lead wires 14 and 15 controlled by switch 32. The generator may also be connected to a series of parallel connected lights 33 or the like, through a pair of lead wires 34 and 35 controlled by a switch 36.

The battery 37 represents a source of stored or line electric power, and it is connected in parallel by wires 38 and 39 to the resistance heating units of the plates 5 and 9, the flow of current to said plates being respectively controlled by switches 40 and 41. A water pressure line 42 controlled by a valve 43, may also be arranged to feed water to the water tubes under pressure, when it is not desired to drive the turbine.

Figure 8:
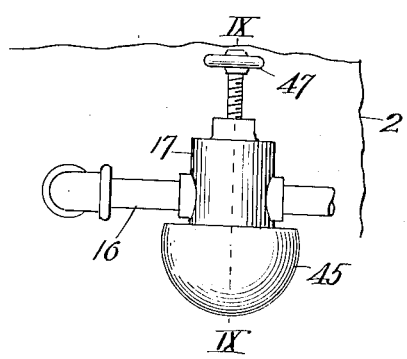
Figure 8 is an enlarged external view of part of the casing member, and of one of the sediment or scale traps of the steam generating plant.
Figure 9:
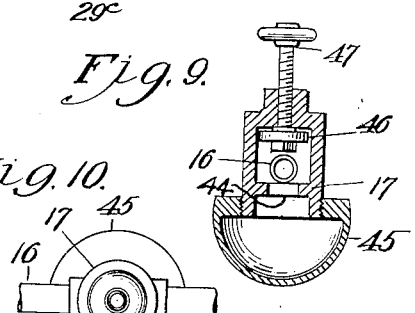
Figure 9 is a section on the line IX—IX of Figure 8.
Figure 10:
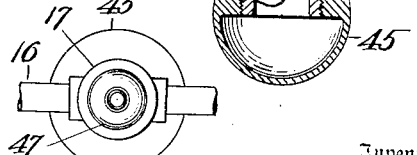
Figure 10 is a plan view of the sediment trap.

If the boiler water is of the type that forms a loose scale, the U-bends may be provided with scale traps such as shown in Figures 8, 9 and 10, in which, a clean-out valve casing 17 is connected to the pipe, said casing having an opening 44 communicating with a removable scale trap or bowl 45. Mounted to seat and seal the opening 44 without interfering with the flow of water or steam through the pipe, is a valve 46, which may be manipulated by a handle 47 to seal the opening 44. When the opening leading to the trap bowl has been closed as described, the bowl 45 may be removed, cleaned and replaced without shutting down operation of the steam generating system.

From the above description it will be apparent that I have produced a self-contained electric steam plant which is of the most flexible nature, and it is to be understood that while I have illustrated and described the preferred embodiment, I reserve the right to all changes within the spirit of the invention and without the ambit of the prior art.

I claim:

1. A steam generator comprising a boiler having a water preheating chamber, a heating chamber and an expansion chamber, a pump for withdrawing water from the preheating chamber and delivering it to the heating chamber, said heating chamber comprising a laminated heating unit of alternately arranged water plates and electrically heated plates, means holding said plates clamped tightly in abutting relation, and a pipe connecting said heating chamber to the expansion chamber.

2. An electric steam generator comprising a steam chamber, a casing surrounding the steam chamber and forming a water preheating chamber, a heater at the bottom of the steam chamber, comprising alternately arranged passageways, one set of passageways being continuous to form a tortuous water heating way, electric resistance heating elements in the other set of passageways, connections from the opposite ends of the tortuous water way to the steam and preheating chambers respectively.

3. An electric steam generator comprising a steam chamber, a casing surrounding the steam chamber and forming a water preheating chamber, a heater at the bottom of the steam chamber comprising alternately arranged passageways, one set of passageways being continuous to form a tortuous water heating way, electric resistance heating elements in the other set of passageways including the uppermost passageway to form a hot plate forming the bottom of the steam chamber, a connection from one end of the tortuous water way to discharge onto the hot plate in the steam chamber, and a connection from the other end of the tortuous water way to the water preheating chamber.

4. An electric steam generator comprising a steam chamber, a casing surrounding the steam chamber and forming a water preheating chamber, a heater at the bottom of the steam chamber comprising alternately arranged passageways, one set of passageways being continuous to form a tortuous water heating way, electric resistance heating elements in the other set of passageways, connections from the opposite ends of the tortuous water way to the steam and preheating chambers respectively, and a pump in the connection between the water way and the preheating chamber for forcing water from the latter to the former.

5. An electric steam generator comprising a steam chamber, a casing surrounding the steam chamber and forming a water preheating chamber, a heater at the bottom of the steam chamber comprising alternately arranged passageways, one set of passageways being continuous to form a tortuous water heating way, electric resistance heating elements in the other set of passageways, connections from the opposite ends of the tortuous water way to the steam and preheating chambers respectively, a pump in the connection between the water way and the preheating chamber for forcing water from the latter to the former, and a steam engine fed from the upper part of the steam chamber for driving said pump.

6. An electric steam generator comprising a steam chamber, a casing surrounding the steam chamber and forming a water preheating chamber, a heater at the bottom of the steam chamber comprising alternately arranged passageways, one set of passageways being continuous to form a tortuous water heating way, electric resistance heating elements in the other set of passageways, connections from the opposite ends of the tortuous water way to the steam and preheating chambers respectively, a steam engine fed from the upper part of the steam chamber, an electric generator driven by said steam engine, and connections from the generator for energizing said electrically energized resistance elements.

JOHN M. STUCKER.